(No Model.) 3 Sheets—Sheet 1.

W. H. BRADLEY.
CUPOLA FURNACE.

No. 516,962. Patented Mar. 20, 1894.

WITNESSES

INVENTOR (No Model.) 3 Sheets—Sheet 2.
W. H. BRADLEY.
CUPOLA FURNACE.

No. 516,962. Patented Mar. 20, 1894.

WITNESSES INVENTOR

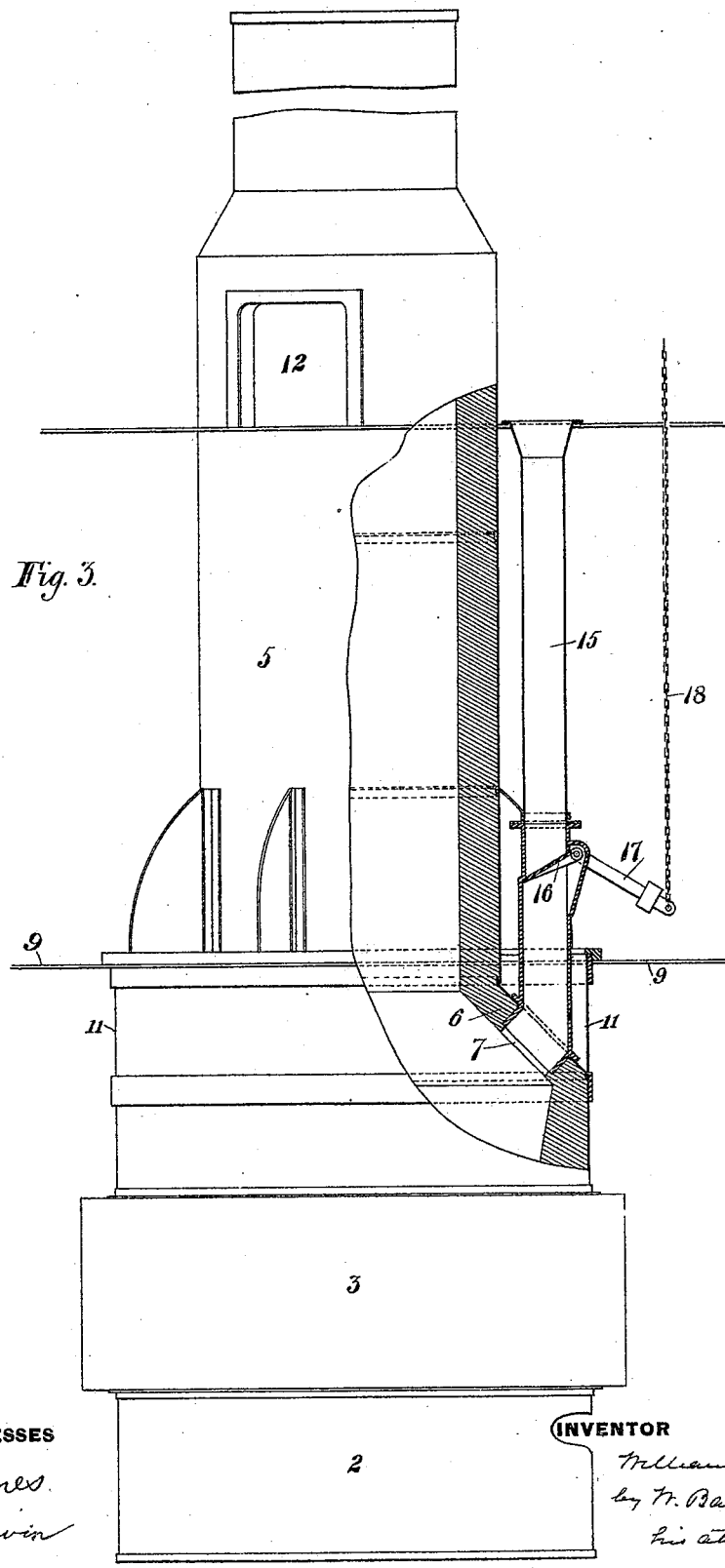

UNITED STATES PATENT OFFICE.

WILLIAM H. BRADLEY, OF MINGO JUNCTION, OHIO.

CUPOLA-FURNACE.

SPECIFICATION forming part of Letters Patent No. 516,962, dated March 20, 1894.

Application filed June 20, 1892. Serial No. 437,256. (No model.)

*To all whom it may concern:*

Be it known that I, WILLIAM H. BRADLEY, of Mingo Junction, in the county of Jefferson and State of Ohio, have invented a new and useful Improvement in Cupola-Furnaces, of which the following is a full, clear, and exact description, reference being had to the accompanying drawings, forming part of this specification, in which—

Figure 1:
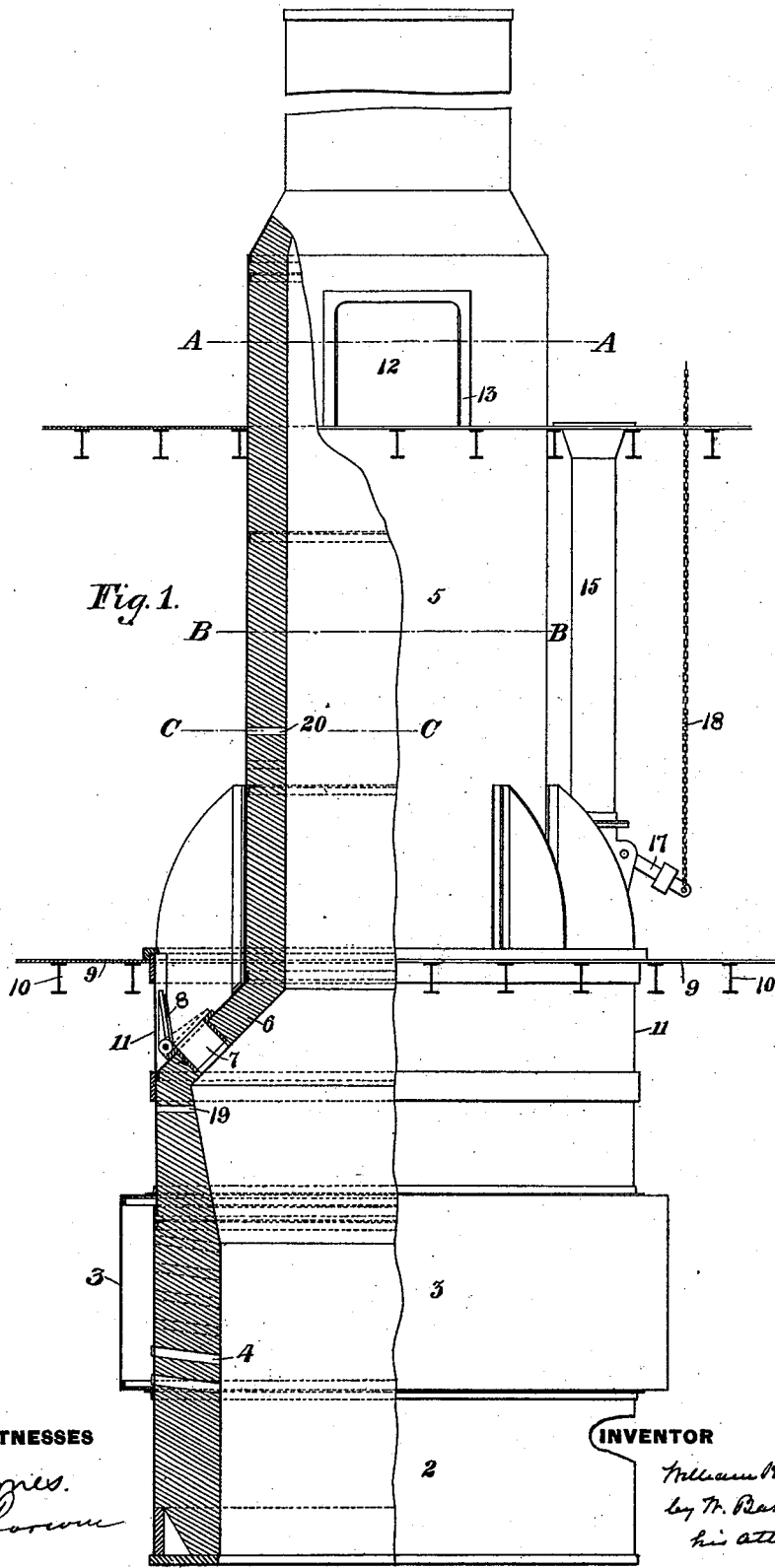
Figure 2:
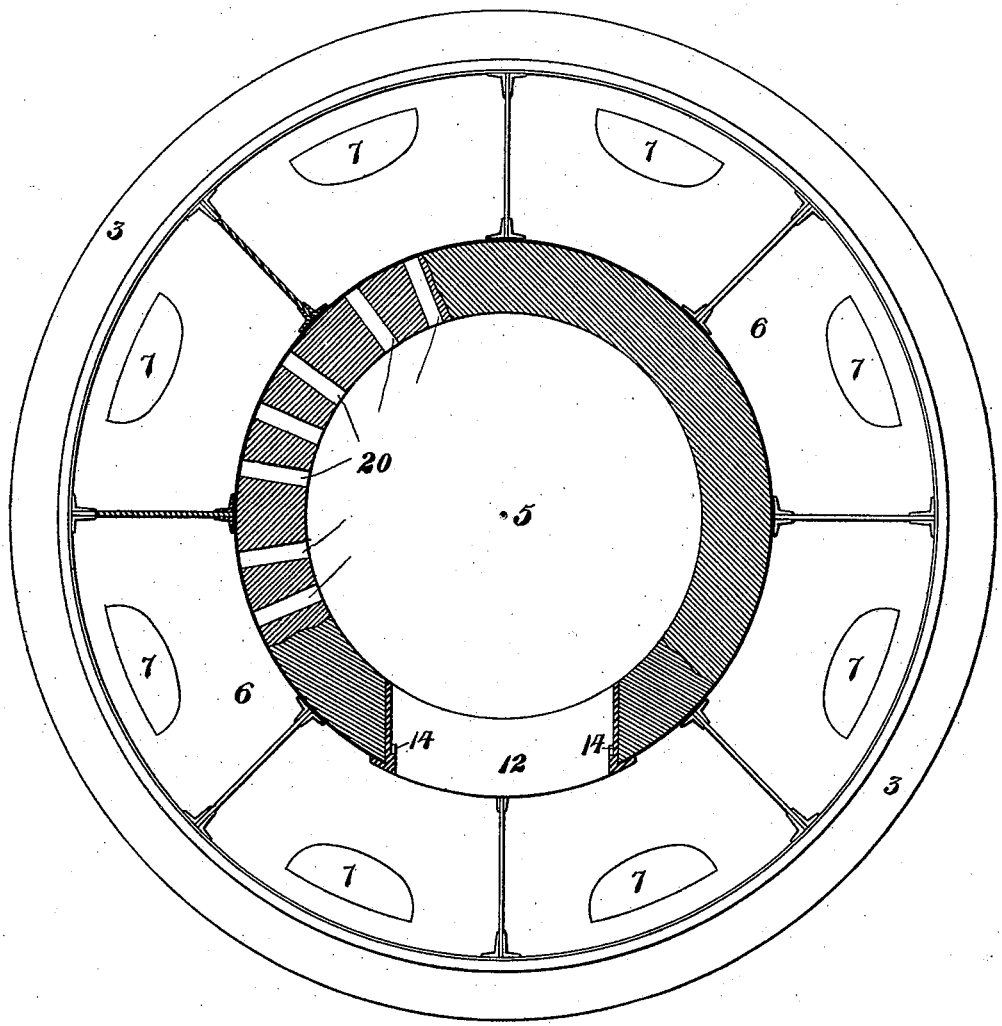

Figure 1 is a side elevation, partly in section, of my improved cupola furnace. Fig. 2 is a cross-sectional view on the lines A—A, B—B and C—C of Fig. 1; and Fig. 3 is a sectional view showing the charging chutes.

In the present working of cupola-furnaces the fuel and metal are charged in together at a certain distance above the tuyeres, and if this distance is small the combustible gases rising through the charge are not wholly consumed and pass off above the charge at a high temperature, thus wasting the heat; while if the distance is large, the fuel is consumed before it descends to the level of the tuyeres, and the metal oxidizes rapidly under the action of the blast, causing a loss of metal. Moreover, in the second case, the slag formed above the tuyeres chills as it meets the cold blast and clogs the cupola, and the $CO_2$ rising through the high charge, is changed to the combustible gas CO, which passes off and is lost. In the present practice, a mean of these extremes is used, partaking of the faults of each but in a lesser degree, and in the best results less than one-half of the heat of the fuel is utilized for the melting of the metal. Various expedients have been tried for overcoming these difficulties, such as blowing in air above the point of incandescent fuel, but this again raises the heat at such point and consumes the fuel, or with a short charge causes the gases to pass off at a high temperature.

My invention is designed to do away with all these difficulties and evil effects of waste of fuel, oxidation of metal, and chilling of the slag, thus creating a great saving in the cost of fuel and increasing the melting capacity of the furnace, and it consists in charging in the fuel on a different level from that of the metal. The level for charging the fuel (depending upon the melting capacity of the cupola) should be at such a distance above the tuyeres that the fuel may become heated to the igniting point before reaching the zone of fusion, but not so high that the fuel will be consumed before descending to the tuyeres. The metal charging level should be at such a height above the fuel-charging level, that the gases of combustion may, before passing off, have sufficient time to be fully consumed and cooled down to the most economical point of temperature, while ascending through the charge of metal, thus utilizing the full effective heat of the fuel by preheating the metal.

In the drawings, the lower portion 2 of the cupola is provided with the usual tuyere belt 3, from which the tuyeres 4 lead into the furnace. The upper portion 5 of the cupola is smaller in cross-section, forming a stack portion concentric with the lower portion, the two being joined by the cone-shaped portion 6. Through this conical portion lead the charging chutes 7 for the fuel, and each chute may have a hinged door 8 for closing the same, these chutes extending in a circular series about the cupola, and being preferably immediately beneath the fuel-charging floor 9 supported upon the I-beams 10. A circular band 11 extends upwardly from the lower part 2 of the cupola to the charging-floor 9, and incloses the charging-openings. In the upper part of the stack is the metal-charging opening 12, which is provided with a hinged door 13, the door resting against stops 14 when in its lowermost position, the closing of the metal-charging openings giving a natural draft at the fuel-openings, by which the combustible gases will be consumed.

In case the cupola cannot be easily fitted up with the fuel-charging floor, I may employ chutes 15, or other suitable devices, leading downwardly from the metal-charging floor to the fuel-charging openings, which may have the hinged doors 16 therein, provided with counterweighted arms 17, which may be operated by a chain 18 from above. I employ also a series of tuyeres 19 at or near the fuel-openings, and a second series 20 above the fuel-openings, to furnish air for burning the combustible gases. The air admitted at and above the fuel-charging openings may be regulated by any suitable device, so that the air will enter in sufficient quantity to consume the gases, but not in such excess as to cool the burning gases.

The operation of my device is obvious. The metal being charged in a central stack on an upper level, and the fuel in openings in the side of the stack at a lower level, or into openings at the cone sheet of a larger concentric stack, the metal will descend in the center with the fuel around the outside, the fuel thus being between the metal and the air-inlets, a condition which is correct in theory and practice and has been much sought after. The blast of air from the tuyeres thus meets the incandescent fuel at and above the tuyeres before it enters the zone of metal; being thereby, heated to the temperature of the zone of fusion it unites with the carbon of the fuel and maintains a reducing and not an oxidizing atmosphere, hence no oxidation of metal takes place, and the slag and metal are not chilled. The flames and hot gases pass into the central zone of metal and ascend through the interstices, up to the fuel-charging level, where air is admitted to burn the carbonic oxide; the flames and heat thus produced ascend through the interstices of the metal, preheating the same without burning the fuel. The fuel is charged at such a point above the tuyeres, that it just attains the igniting point as the zone of fusion is reached, since if too high the fuel is consumed before reaching the tuyeres, and the entering air chills the slag and oxidizes the metal, while if too low the fuel reaches the tuyeres in too cool a condition and reduces the zone of fusion, thus lowering the melting capacity of the cupola and wasting the fuel, which falls below the zone of fusion before being consumed and gives up its carbon to the metal, thus requiring a longer blowing in the converter and delaying each heat. This distance between the charging point of fuel and the tuyeres depends upon the rapidity of melting of the cupola, since the more rapid the descent of the charge, the greater must this distance become. To regulate this distance I employ several rows of tuyeres, one above the other, and if running slowly the upper tuyeres are used, the others being stopped off, the lower tuyeres being employed when running faster. The fuel having only a short distance to descend is not consumed before reaching the tuyeres, and hence the highest point of temperature in the zone melting fusion is at and immediately above of the tuyeres at all times, while the slag formed at this point in descending, falls below the zone of blast, and is not chilled thereby. Moreover, the metal, as it melts, immediately falls below the line of tuyeres and is therefore not oxidized by the blast, and the hot gases and burning carbonic oxide pass up through the metal and give up their entire heat thereto.

I am aware that it has heretofore been proposed to heat the metal above the point of introduction of the fuel merely by the surplus heat of the ascending gases, but I believe I am the first to so proportion the distance between the fuel-charging openings and the tuyeres, that the fuel is preheated just to the temperature of ignition when it reaches the zone of fusion, and to introduce air at or above the fuel-openings so as to combine with the rising carbonic oxide and burn in contact with the metal alone, above the level of the fuel, especially when this air is so regulated as to give the proper amount for uniting with the carbonic oxide.

The advantages of my construction arise from the great saving in the expense of running the furnace due to the reduction in the amount of fuel employed, and from the total lack of any clogging or uneven action of the charge, while the invention is easily applied to existing conditions.

Many changes may be made in the form and arrangement of the parts without departure from my invention, which I regard as lying broadly in the furnace having fuel and metal-charging openings at different levels and admitting air for burning the gases above the fuel-charging level. I do not intend to limit the invention to the melting of metal only, as it may be applied to the reduction of other materials as well.

I claim—

1. A furnace having above its crucible one or more fuel-charging openings, one or more metal-charging openings above the fuel-charging openings, and means for supplying air to unite with the carbonic oxide rising from the fuel and preheat the metal before it reaches the fuel; substantially as described.

2. A furnace, having one or more metal-charging openings, an outer circumferential series of fuel-charging openings at a lower level, means for supplying air to unite with the carbonic oxide rising from the fuel and burn in contact with the metal; substantially as and for the purposes described.

3. A furnace, having a series of tuyeres or air-blast inlets, circumferential fuel-charging openings above the same, and one or more metal-charging openings above the fuel-charging openings; substantially as and for the purposes described.

4. A furnace, having above its crucible one or more fuel-charging openings, one or more metal-charging openings above the fuel-charging openings, and one or more air-inlets at or adjacent to the fuel-charging openings; substantially as and for the purposes described.

5. A furnace having above its crucible one or more fuel-charging openings, an air-inlet or a series of air-inlets at or adjacent to the fuel-charging openings, and an air-inlet or inlets above the same; substantially as described.

6. A furnace having, above the ordinary tuyere-belt, an opening or series of fuel-charging openings in its circumference, covers or doors for said openings, and one or more metal-charging openings above the fuel-charging openings; substantially as and for the purposes described.

7. A furnace having, above the ordinary tuyere-belt, opening or series of fuel-charging openings in its circumference, one or more metal-charging openings above the fuel-charging openings, and covers or doors for said openings; substantially as and for the purposes described.

8. A cupola or furnace, having two or more series of blast-inlets above its crucible, and one or more fuel-charging openings between two or more of the said series; substantially as and for the purposes described.

9. The method of operating furnaces, consisting in charging substantially the entire body of fuel at a suitable level, charging the metal at a higher level, admitting air above the zone of fusion to unite with the carbonic oxide rising from the fuel, and burning the same in contact with the unmelted metal; substantially as described.

10. The method of operating furnaces, consisting in charging in substantially the entire body of fuel at a lower level than and concentrically around the descending charge of metal, admitting air above the zone of fusion to unite with the carbonic oxide rising from the fuel and burning the same in contact with the unmelted metal; substantially as and for the purposes described.

11. A furnace, having above its crucible, one or more fuel-charging openings, one or more metal-charging openings above the fuel-charging openings, and an air-inlet or inlets between the fuel and metal-charging openings; substantially as and for the purposes described.

In testimony whereof I have hereunto set my hand this 25th day of May, A. D. 1892.

WILLIAM H. BRADLEY.

Witnesses:
  W. A. ELLIOTT,
  WM. R. MCKAIN.